US012513125B2

(12) United States Patent
Nolton et al.

(10) Patent No.: US 12,513,125 B2
(45) Date of Patent: Dec. 30, 2025

(54) CRYPTOGRAPHIC MESSAGING DEVICE

(71) Applicant: Amazon Technologies, Inc., Seattle, WA (US)

(72) Inventors: David M. Nolton, Ashburn, VA (US); Jose Troche, Gaithersburg, MD (US); Richard M. Weatherly, Vienna, VA (US); Robert Hill Bolling, North Chesterfield, VA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 18/344,349

(22) Filed: Jun. 29, 2023

(65) Prior Publication Data

US 2025/0007894 A1    Jan. 2, 2025

(51) Int. Cl.
*H04L 9/40* (2022.01)
*H04L 9/08* (2006.01)

(52) U.S. Cl.
CPC ........ *H04L 63/0442* (2013.01); *H04L 9/0825* (2013.01)

(58) Field of Classification Search
CPC . H04L 63/0442; H04L 9/0825; H04L 63/061; H04L 63/0428; G06F 21/602; G06F 21/606
See application file for complete search history.

(56) References Cited

U.S. PATENT DOCUMENTS

| | | | |
|---|---|---|---|
| 9,294,425 B1* | 3/2016 | Son | H04L 51/18 |
| 10,313,123 B1* | 6/2019 | Grubin | H04L 9/0838 |
| 2016/0065376 A1* | 3/2016 | Smith | H04L 63/0435 |
| | | | 713/171 |
| 2016/0309331 A1* | 10/2016 | Moon | H04W 12/08 |
| 2021/0091829 A1* | 3/2021 | Shake | H04B 7/0868 |
| 2022/0247729 A1* | 8/2022 | Hsu | H04L 63/045 |

OTHER PUBLICATIONS

International Search Report and Written Opinion, PCT App. No. PCT/US2024/035530, Oct. 9, 2024, 12 pages.
Rohde & Schwarz "TopSec Mobile Abhorsicher telefonieren", Feb. 1, 2014, 12 pages.

* cited by examiner

*Primary Examiner* — Henry Tsang
(74) *Attorney, Agent, or Firm* — Nicholson De Vos Webster & Elliott LLP

(57) ABSTRACT

Techniques for cryptographic messaging are described. In some examples, cryptographic messaging is enabled on a device that at least includes an input/output port configured to receive an encrypted message from a coupled external device; a hardware security module (HSM) configured to decrypt the encrypted message, wherein the HSM is to include storage to store at least one private key to be used to decrypt the encrypted message; and a screen to display contents of the decrypted message.

20 Claims, 12 Drawing Sheets

CRYPTOGRAPHIC MESSAGING DEVICE

BACKGROUND

Customer enterprises working in sensitive domains experience a lack of visibility, delay, and team stress when responding to unscheduled, time-critical issues. For example, teams wishing to discuss the details of a sensitive operational problem may be required to do so in a physical location. Waiting for team members to arrive at the location delays issue resolution. Because some details cannot be shared over public networks due to security issues, it is hard to determine who has relevant insights on the problem at hand. Consequently, often more team members are asked to be present than is necessary.

Delay and wasted effort would be avoided if leaders had the ability to exchange a few lines of sensitive information with the team before determining who needs to be in the location for in-depth collaboration and who can contribute remotely. Informed decisions about who needs to travel and who contributes remotely optimizes team effectiveness and enhances team member satisfaction.

Distributed teams have embraced cellphone-based text messaging as an effective collaboration tool. Unfortunately, security sensitive customers, however, do not trust cellphone hardware, system software, nor applications thereof.

BRIEF DESCRIPTION OF DRAWINGS

Various examples in accordance with the present disclosure will be described with reference to the drawings, in which.

DETAILED DESCRIPTION

Figure 1:
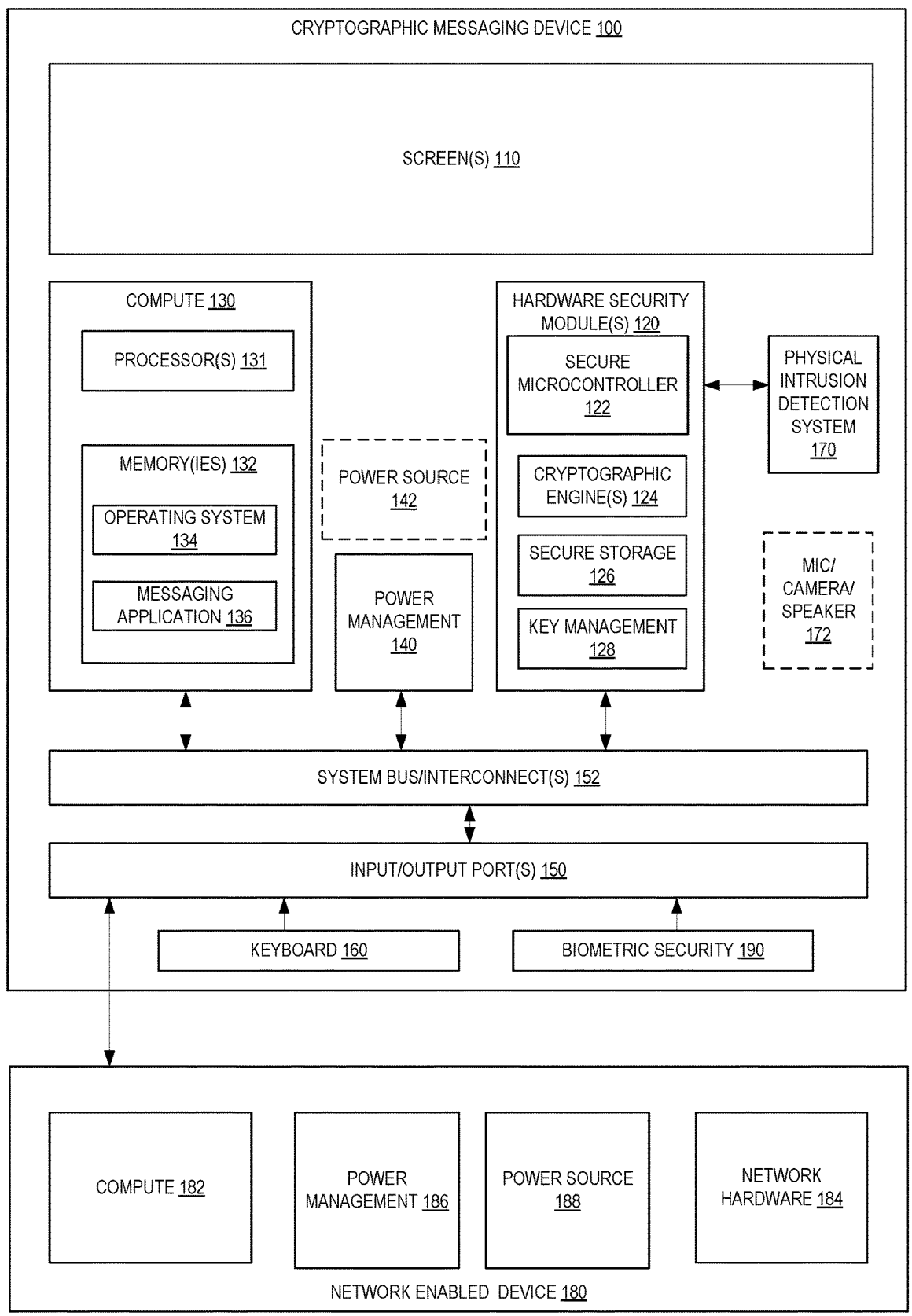
FIG. 1 illustrates examples of a cryptographic messaging device.

The present disclosure relates to methods, apparatus, systems, and non-transitory computer-readable storage media for secure communications. In some examples, a cellphone (or other internet access device) is minimally used to relay secure communications to/from a coupled cryptographic communications device.

Existing solutions to sending and receiving cryptographic communications generally rely on software applications running on general purpose machines (phones, tablets, personal computers, etc.). For example, a popular way to have cryptographic communications is to use an encrypted messaging program installed and running on a smartphone. Typically, these applications make their cryptographic libraries available in open source and provide client and server implementations. These resources will guide the device design and encourage trust by security accreditors. Unfortunately, these software solutions still require running on a device that is not, by default, secure at all times. That is messages are input in the clear into the software which the operating system of the device has access to. If there is malware or other malicious software on that device these messages may be intercepted and made available to a bad actor.

Examples detailed herein are for a cryptographic communications device that is isolated from its means of external communication. That is the device is to be coupled (e.g., using a cable) to a cellphone (or other internet access device) and the networking capabilities of the cellphone (or other internet access device) are to be used to transmit messages that are encrypted before they are a provided to the cellphone (or other internet access device). As such, the operating system or other software on the cellphone (or other internet access device) never has access to any unencrypted data of the cryptographic communications device.

The cryptographic communications device allows a user to compose, display, send, and/or receive cryptographic messages (the message content may be text, audio, video, image, a combination thereof, etc.) For example, the cryptographic communications device can take in clear text from its own dedicated keyboard (hardware or virtual), encrypt the clear text as a part of an encrypted message, and use the cellphone's networking capabilities to transmit the encrypted message. Similarly, encrypted messages are received via the cellphone's networking capabilities, decrypted by the cryptographic communications device, and then presented on a display of the cryptographic communications device. Clear text messages never pass through the cellphone, nor are clear text messages transmitted or received via public networks. The cryptographic communications device uses pair-wise, end-to-end, cryptographic technology. In some examples, encrypted audio, image, and/or audio/video including messages are supported. Similar to text messages, these messages are not passed through the cellphone in the clear.

In some examples, the cryptographic communications device is attached to the back of a cellphone, in the form of a protective case, and provides an independent physical interface on which to compose and display text messages. The cryptographic communications device contains a cryptographic capability to create secure channels between pairs of communicating users. The cryptographic communications device obtain electrical power and/or internet access and nothing else. The connection may be made by a cable such as a universal serial bus (USB) or Lightening® cable.

In some examples, each cryptographic communications device is registered with a service (e.g., a provider network service) to register the device and/or users. Users may be assigned to one or more groups if segregation of user communication is desired. Groups can be used, for example, to enforce isolation or to bind communication to specific classification levels such as Confidential or Secret. Cryptographic material is used to irrevocably associate a user's name, biometric characteristic, and/or a set of authorized groups with each cryptographic communications device.

FIG. 1 illustrates examples of a cryptographic messaging device. The cryptographic messaging device 100 allows for a use to send and receive encrypted and signed messages through insecure mobile phones, networks, devices, servers, and services. Only the receiving device is able to decrypt and verify the signature of the message which protects the integrity and secrecy of the message's contents.

The cryptographic messaging device 100 includes compute resources 130 such as a one or more processors 131 to execute a messaging application 136 running on an operating system 134 stored in memor(ies) 132. The messaging application 136 utilizes one or more hardware security modules (HSMs) 120 to send and receive encrypted and signed messages. In some examples, the messaging application 136 is stored in secure storage 126 of the HSM 120 when not in use. In some examples, the messaging application 136 is executed in a secure enclave. In some examples, messages handled by the messaging application 136 are ephemeral and once read are erased. In some examples, messages are manually deletable.

Cryptographic operations are executed inside the HSM 120 which uses and protects a private key used to sign messages. A public key of a recipient is used to generate a shared key that is used to encrypt signed messages. In some examples, one or more cryptographic engines 124 generate keys. Examples of cryptographic ciphers that are supported may include but are not limited to: Elliptic Curve (ECC), ECDSA, ECDH, AES-256, SHA256, SHA3 (KECCAK), and/or post-quantum encryption algorithms. In some examples, the, one or more cryptographic engines 124 utilize a physical unclonable function (PUF). In some examples, public keys are provided offline (e.g., not using a messaging service).

The HSM 120 generates and stores keys (e.g., private and shared keys) in secure storage 126 in a tamper resistant manner using key management 128. In some examples, the generated keys are never exposed outside of the HSM.

In some examples, a secure microcontroller 122 is used to supervise device multifactor identity/authentication and/or physical security, run the key management 128, and/or isolate the secure elements (key management 128, secure storage 126) from the compute resources 130.

In some examples, the HSM 120 is used to monitor for symptoms of physical tampering using a physical intrusion detection system 170 which may do one or more of: monitor power quality to detects anomalies such as brown-out events, detect shock and orientation change events using one or more accelerometers, and/or use perimeter integrity circuits to detect breaks in a defined wire loops/mesh. In some examples, biometric security 190 such as a fingerprint reader is used to access the cryptographic messaging device 100.

The cryptographic messaging device 100 is locked down such that it cannot communicate wirelessly (via Wi-Fi®), Bluetooth®, etc.) and can only attach via cable to its host device. However, when the message leaves the cryptographic messaging device 100, it is already encrypted and travels encrypted all the time until it reaches a destination device, which contains the only private key able to decrypt the message. Additionally, the cryptographic messaging device 100 locks itself if its operating system 134 or applications such as messaging application 136 is modified or tampered with.

In some examples, the cryptographic messaging device 100 includes one or more screen(s) 110 to allow a user to use the messaging application 136 and/or other applications. The one or more screen(s) 110 are a touch screen in some examples. In some examples, the one or more screen(s) 110 provide a virtual keyboard for input. In some examples, a physical keyboard 160 is used for input.

In some examples, the cryptographic messaging device 100 includes one or more of a microphone, camera (still and/or video), and/or a speaker. The microphone and/or camera may be used as input for the messaging application 136.

In some examples, the cryptographic messaging device 100 includes a power management component 140 to control power to the compute resources 130, HSM 120, etc. In some examples, power is obtained using one or more input/output (I/O) port(s) 150 when the cryptographic messaging device 100 is coupled to a network enabled device 180. That is the cryptographic messaging device 100 may not have its own power source 142 and may get power from an external power source 188. I/O port(s) 150 may be one or more of universal serial bus (USB) ports, Lightening® ports, etc.

In some examples, one or more of a system bus and/or interconnect(s) 152 are used to couple various aspects of the cryptographic messaging device 100.

In some examples, a network enabled device 180 provides power (via power manager 186 and power source 188) and/or network access (via networking hardware 184 such as cellular or satellite communication hardware). Note that the network can be a network other than the internet. In some examples, compute resources 182 includes one or more processors, memory, and an OS. In some examples, the OS controls network access and that aspect of the OS is accessed by the cryptographic messaging device 100. In other examples, the cryptographic messaging device 100 bypasses the OS to use the networking hardware 184.

Figure 2:
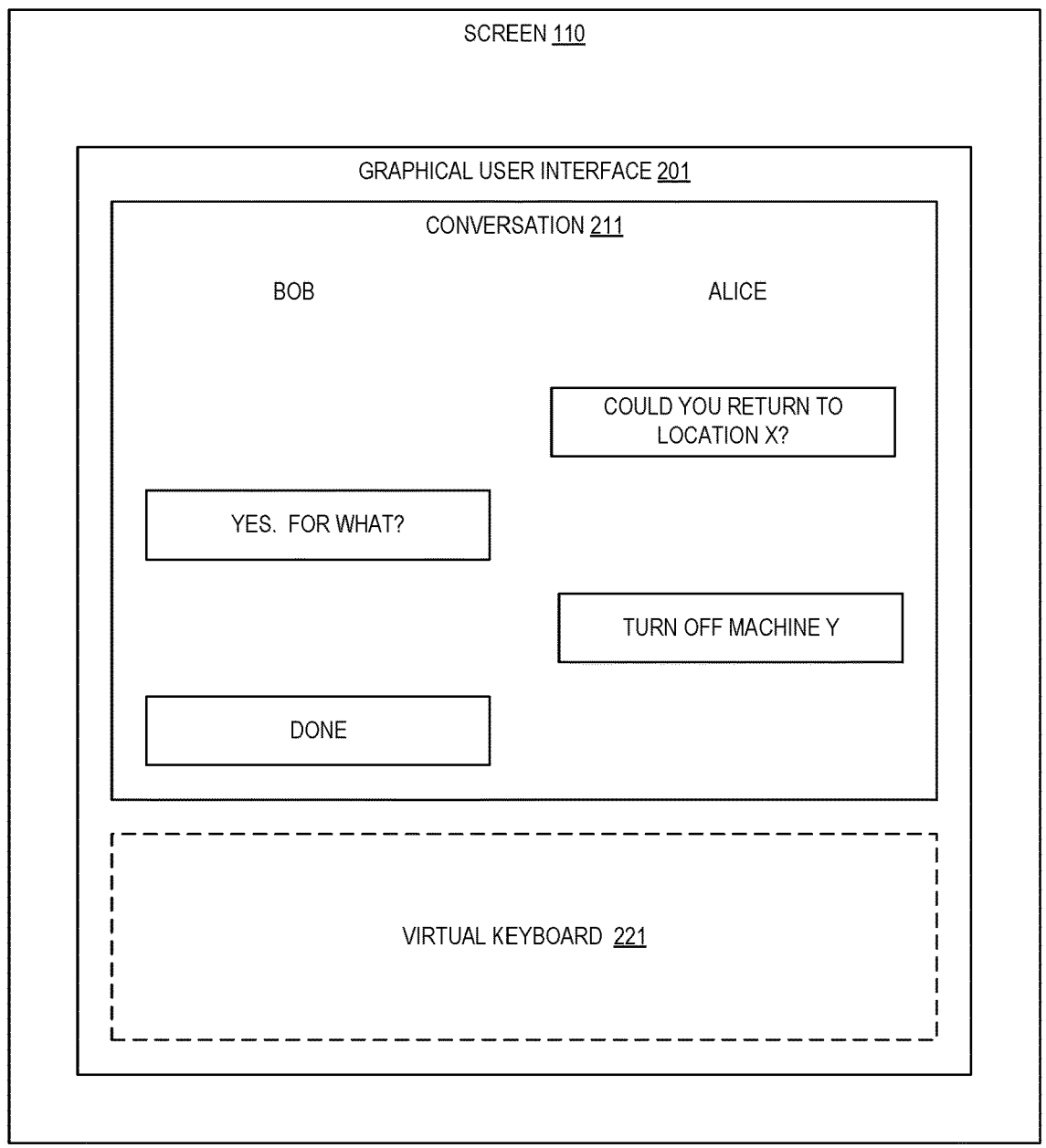
FIG. 2 illustrates examples of a screen of a cryptographic messaging device.

FIG. 2 illustrates examples of a screen of a cryptographic messaging device such as cryptographic messaging device 100. As shown, a graphical user interface (GUI) 201 allows for a user to have a "conversation" 211 with another party that also has a cryptographic messaging device. In this example, the conversation is between Alice and Bob. Each of the messages in this conversation are encrypted on the user's cryptographic messaging device and then sent to the other party to be decrypted and displayed. In some examples, a virtual keyboard 221 allows for text to be entered, files to be shared, etc.

Figure 3:
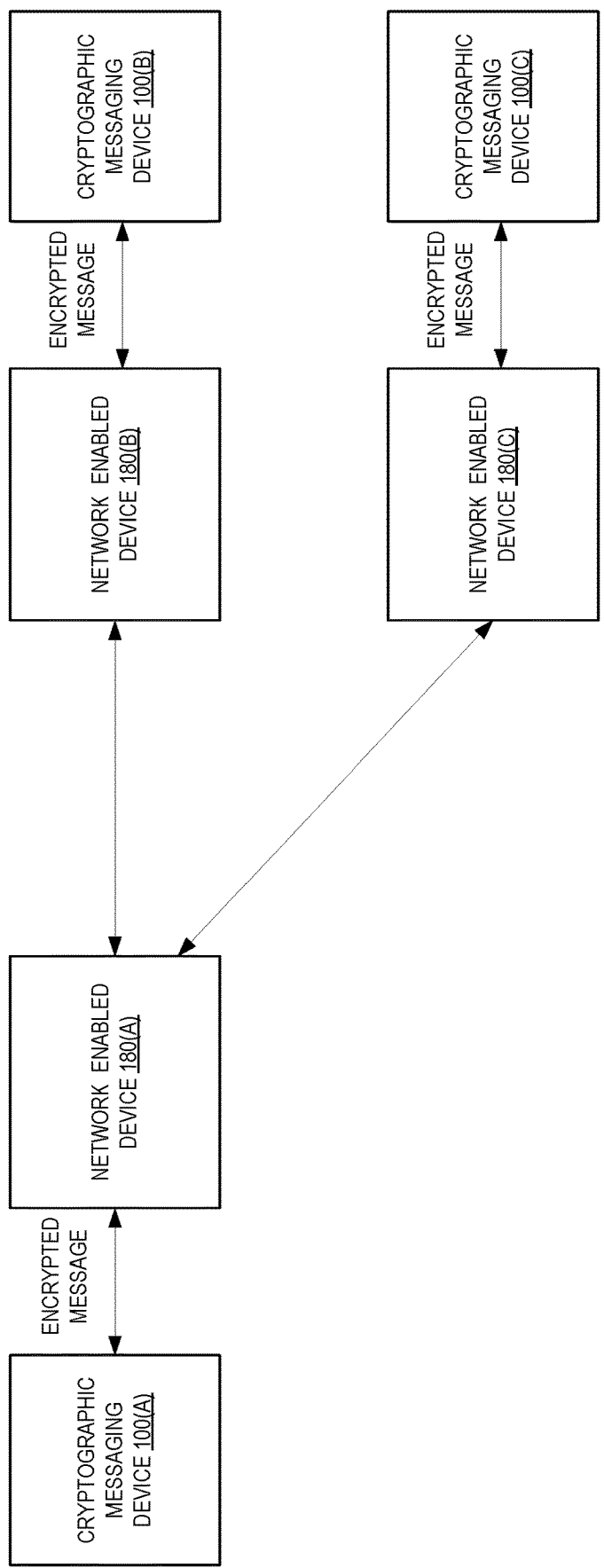
FIG. 3 illustrates examples of using cryptographic messaging devices.

FIG. 3 illustrates examples of using cryptographic messaging devices. As shown, a cryptographic messaging device 100(A) (user "Alice") sends an encrypted message via a coupled to a network enabled device 180(A) to cryptographic messaging device 100(B) (user "Bob") and cryptographic messaging device 100(C) (user "Caleb") through network enabled device 180(B) and network enabled device 180(C) respectively. In this example, the encrypted message is sent directly without an intermediate messaging service. In some examples, Elliptic Curve Diffie-Hellman techniques are used to create unique, secure channels between all pairs of communicants. That is Alice has a completely separate and independently derived key set for her exchanges between Bob and Caleb. Bob and Caleb decrypt the messages at least in part using their internally stored key(s).

Figure 4:
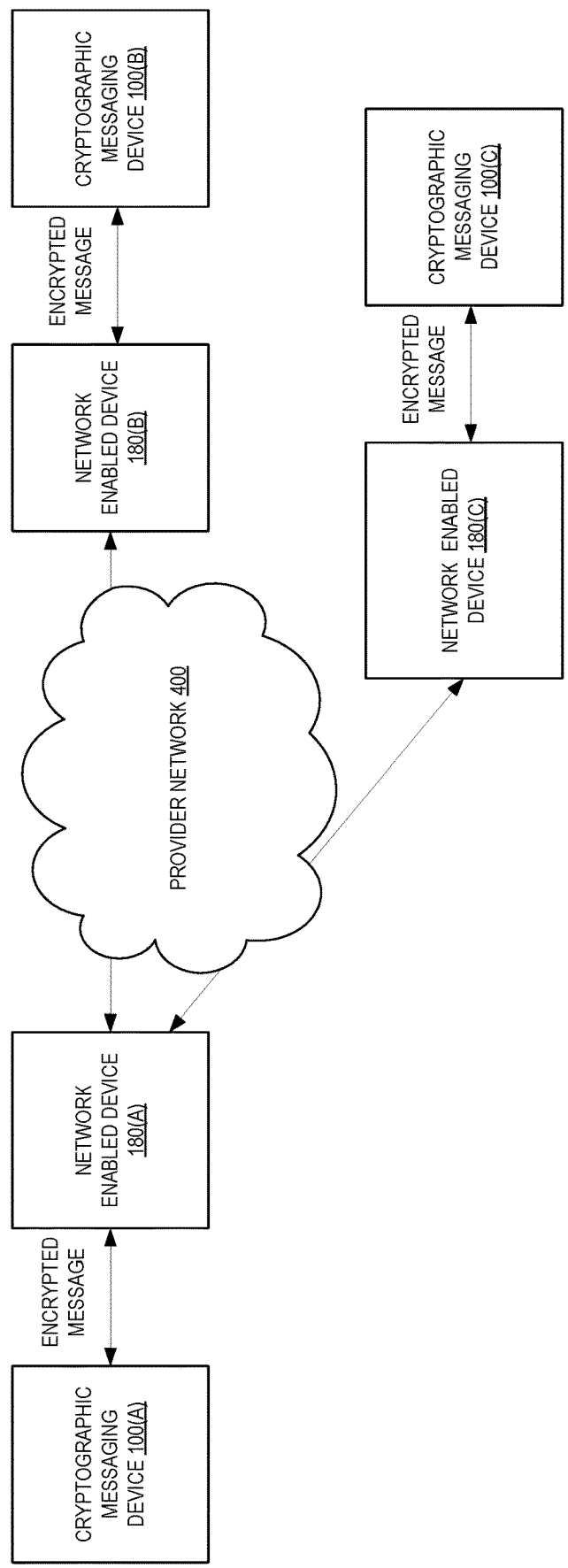
FIG. 4 illustrates examples of using cryptographic messaging devices.

FIG. 4 illustrates examples of using cryptographic messaging devices. As shown, a cryptographic messaging device 100(A) (user "Alice") sends an encrypted message via a coupled to a network enabled device 180(A) to cryptographic messaging device 100(B) (user "Bob") and cryptographic messaging device 100(C) (user "Caleb") through network enabled device 180(B) and network enabled device 180(C) respectively. In this example, the encrypted message is sent through an intermediate messaging service. In some examples, Elliptic Curve Diffie-Hellman (ECDH) techniques are used to create unique, secure channels between all pairs of communicants. That is Alice has a completely separate and independently derived key set for her exchanges between Bob and Caleb. Bob and Caleb decrypt the messages at least in part using their internally stored key(s).

In some examples, messages are sent to/from the provider network 400 using hypertext transfer protocol secure (HTTPS). In some examples, messages are sent using MQ Telemetry Transport (MQTT). MQTT uses a publish/subscribe communication model where the client that sends (publishes) a message is decoupled from the receiver (subscriber) device via a third party. When the connection from a subscribing client to a broker is broken, then the broker will buffer messages and push them out to the subscriber when it is back online. When the connection from the publishing client to the broker is disconnected without notice, then the broker can close the connection and send subscribers a cached message with instructions from the publisher. An MQTT broker acts as a go-between for the clients who are sending messages and the subscribers who are receiving those messages.

In some examples, messages are sent/received using a different transfer protocol such as Constrained Application Protocol (CoAP), Advanced Message Queuing Protocol (AMQP), Simple/Streaming Text Oriented Messaging Protocol (STOMP), Mosquito, Simple Media Control Protocol (SMCP), etc.

In some examples, the provider network 400 includes a device messaging service to handle messages. The provider network 400 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 400 can use one or more user accounts that are associated with a customer account, though these terms can be used somewhat interchangeably depending upon the context of use. Users can interact with a provider network 400 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 400 that includes "backend" services supporting and enabling the services that can be more directly offered to customers.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 400 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 400. In some examples, these resources can be maintained in a "ready" state (e.g., having a pre-initialized runtime environment configured to execute the serverless functions), allowing the serverless functions to be executed in near real-time.

Figure 5:
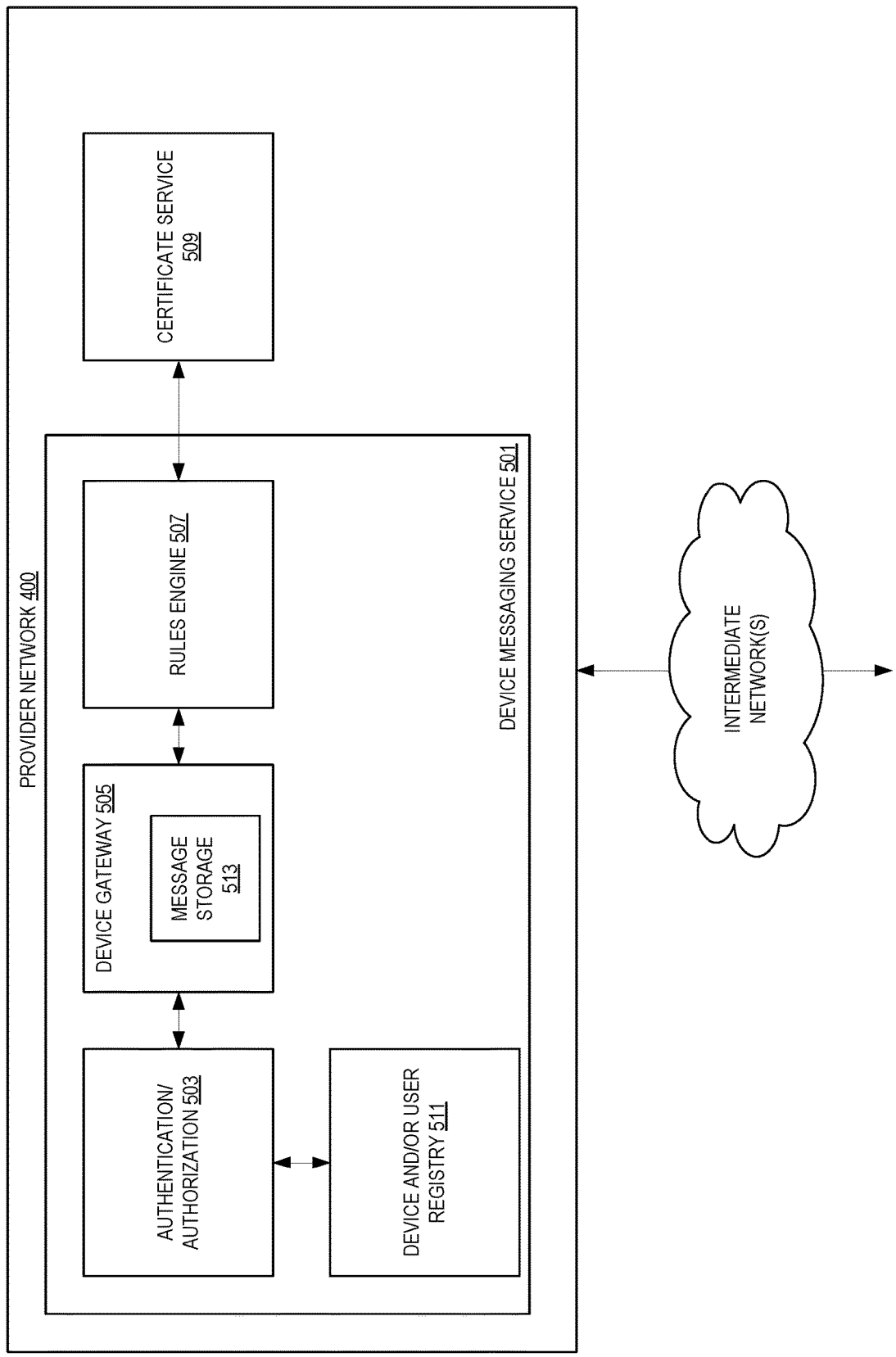
FIG. 5 illustrates examples of a provider network and device messaging service thereof.

FIG. 5 illustrates examples of a provider network and device messaging service thereof. The device messaging service 501 allows for user devices to communicate with each other, allows for registration of users and devices, stores and provides a public key for registered cryptographic devices, and provides the infrastructure for devices to send and pull (encrypted) messages.

A device and/or user registry 511 stores information about cryptographic devices such as identification information, owner (user), contact information, etc. In some examples, users are registered and verified by a trusted human agent. If verified, a unique user identifier is generated. The trusted agent, in some examples, obtains the user's biometric data and biometric features, customer contact information, and user ID are added to a secure user directory of the registry 511. In some examples, public keys (e.g., generated by certificate service 509) for each device are stored in the registry 511.

A user's ID is associated with a unique serial number of a cryptographic messaging device. In some examples, the registration of a cryptographic messaging device causes an encrypted operating system image to be loaded into the device. A key to decrypt the operating system image is loaded into the device's HSM. This key is used to decrypt the operating system image each time the device boots up. The customer's biometric features (when used) are entered into the device HSM.

The HSM is triggered to generate a set of private keys. The private keys cannot be extracted from the HSM and will be erased by the HSM, along with all identifying information such as the biometric features, if the HSM detects an attempt to physically compromise the device. Authentication (e.g., biometrics, camera, pin code, password, etc.) plus the HSM physical compromise detection mitigates the risk of smash-and-grab attacks. Additionally, there is no customer message data retained at rest. The only data retained when the device is powered down are the keys stored in the HSM and the encrypted operating system image.

Users can resign voluntarily or involuntarily. At any moment and for any reason, the administrator of the device messaging service 501 can revoke the privileges granted to a specific device and delete the owning user's information from the registry 511. This isolates the device from the device messaging service 501 and all other user devices, as would be required if a cryptographic messaging device was lost or stolen. For a planned user resignation, a trusted human agent would collect the device and isolate it from all other users and the device messaging service 501. The trusted agent could recycle the device by zeroing its HSM, checking the device for evidence of physical tampering, and then re-registering it to a new user.

An authentication/authorization component 503 verifies the identities of devices. This authentication may be a server authentication (allowing devices to ensure they are communicating with the right service) and/or a client authentication where devices authenticate themselves. In some examples, X.509 certificates are used. Authorization determines if the devices is allowed to access messages, etc.

A device gateway 505 handles connections and communications for devices. In some examples, the device gateway 505 is the message broker for a publish/subscribe model. Messages to be delivered are stored in message storage 513. In some examples, the storage is encrypted (thus the messages themselves are encrypted multiple times). In some examples, the device messaging service 501 generates an out-of-band message to alert a receiving device that there is a message being stored for the receiving device.

A rules engine 507 allows for devices to interact with other services of the provider network 400. Rules are analyzed and actions are performed.

A certificate service 509 allows for the generation of keys/certificates to be used.

In some examples, the device messaging service 501 does not have the ability to decrypt any messages. In some examples, the device messaging service 501 stores a message until a cryptographic messaging device connects to the service and receives it but does not keep it longer than that (if so configured). The device messaging service 501 supports multiple organizations each with isolated sets of cryptographic devices.

To send a message using the device messaging service 501, a user looks up the recipient in the registry 511. The sender's device connects to the recipient device by way of the device messaging service 501. Once connected, the sender's device and the recipient's device derive unique cryptographic material for a secure, post-compromise safe (e.g., using a double rachet algorithm), pair-wise conversation. This ensures that the device messaging service 501, cavesdroppers, nor man-in-the-middle attackers can observe or compromise the conversation.

Figure 6:
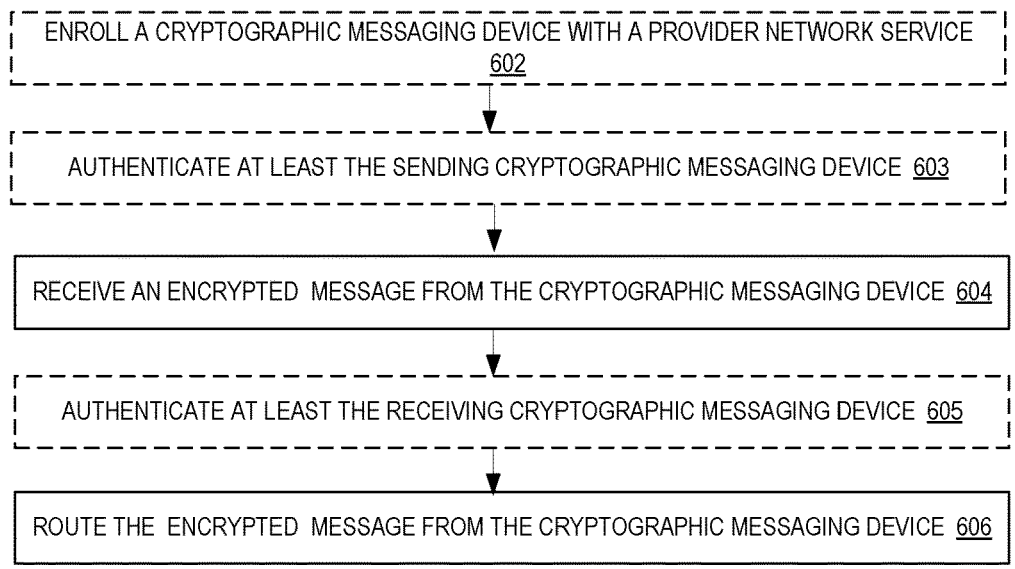
FIG. 6 is a flow diagram illustrating operations of a method for using a cryptographic device according to some examples.

FIG. 6 is a flow diagram illustrating operations of a method for using a cryptographic device according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by one or more of a cryptographic messaging device, messaging service, etc. of the other figures.

In some examples, a cryptographic messaging device is enrolled with a provider network service at 602. This enrollment allows for the cryptographic messaging device to send and/or receive messages.

Figure 7:
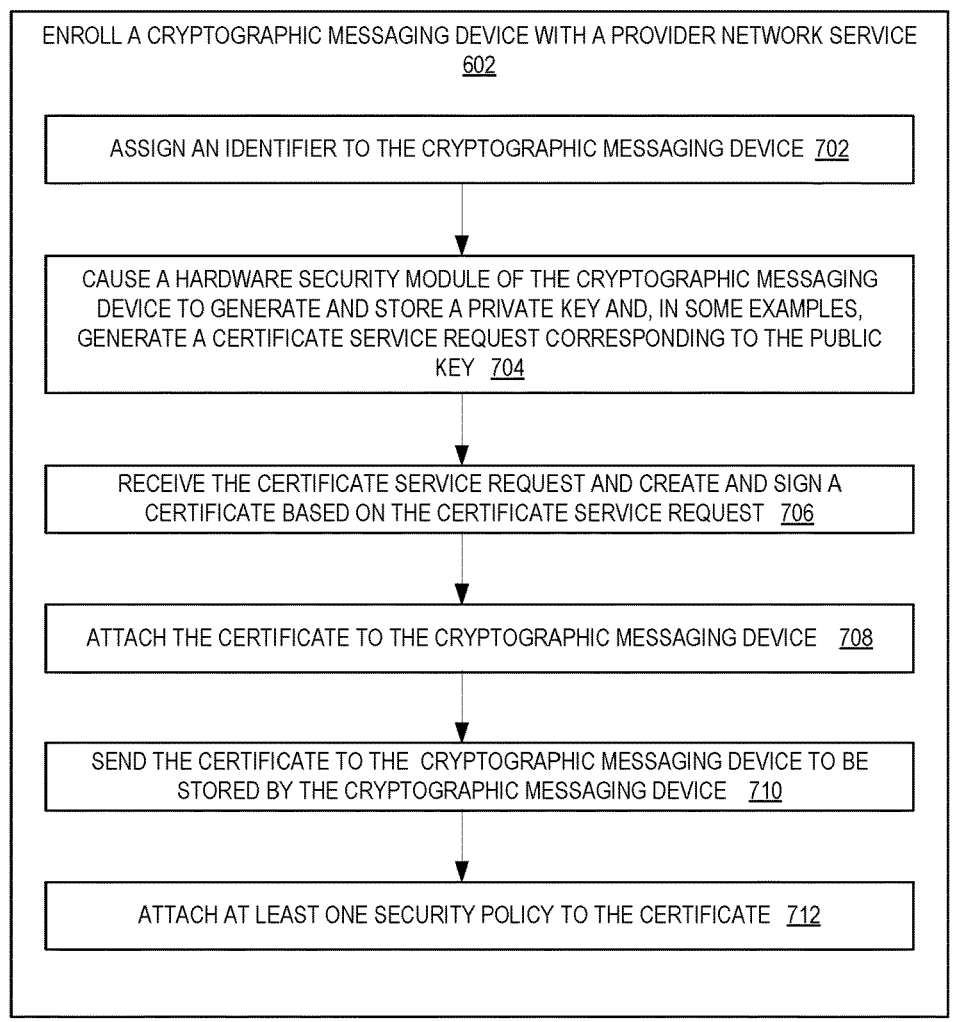
FIG. 7 is a flow diagram illustrating operations of a method for enrolling a cryptographic messaging device according to some examples.

FIG. 7 is a flow diagram illustrating operations of a method for enrolling a cryptographic messaging device according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by one or more of a cryptographic messaging device, messaging service, etc. of the other figures.

An identifier to the cryptographic messaging device is assigned at 702. This identifier is used to uniquely identify the device and is associated with a particular user. As such, messages directed to a user can be routed to the correct device. However, even if messages were routed incorrectly, the wrong receiving device will not have the required information to decrypt the message.

A hardware security module of the cryptographic messaging device is engaged to generate and store a private key and, in some examples, generate a certificate service request corresponding to a public key for the device and/or user at 704.

The certificate service request is received, and a certificate authority is made to create and sign a certificate at 706. For example, certificate service 509 is invoked.

The certificate is attached to the cryptographic messaging device at 708. That is the certificate is attached to the device in the registry 511. The certificate is also sent to the cryptographic messaging device to be stored by the cryptographic messaging device at 710. As such, the cryptographic messaging device has a unique certificate to authenticate its identity.

At least one security policy is attached to the certificate (and device) at 712. The policy allows for the device to send and receive messages.

Figure 8:
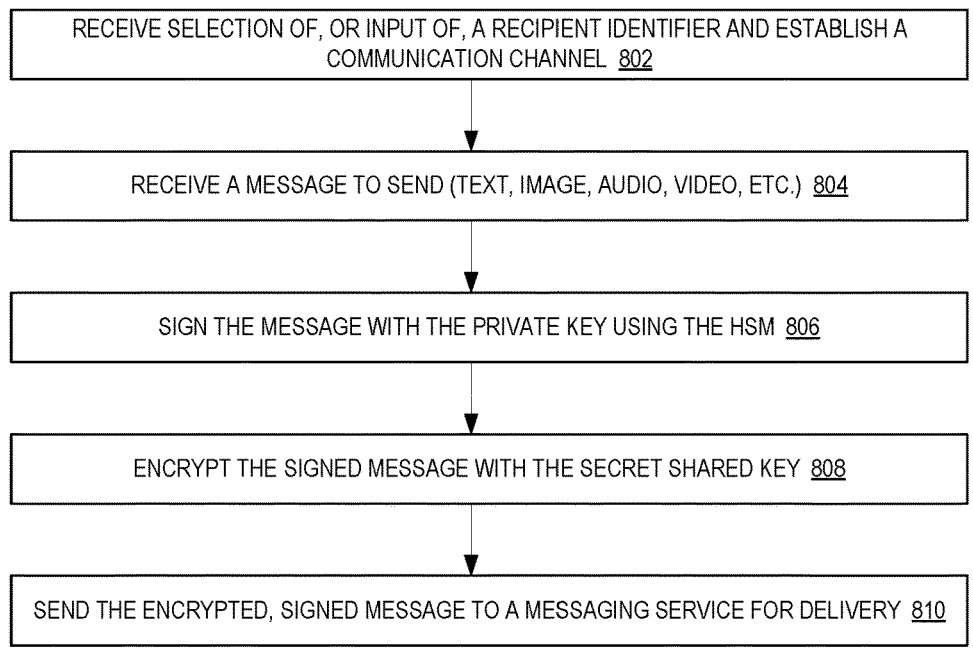
FIG. 8 is a flow diagram illustrating operations of a method for generating a message to be received according to some examples.

At some point in time, an encrypted message is received from the cryptographic messaging device at 604. In some examples, this occurs after at least the sending cryptographic messaging device has been authenticated at 603. This message is to be sent to a desired recipient. FIG. 8 is a flow diagram illustrating operations of a method for generating a message to be received according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by one or more of a cryptographic messaging device, messaging service, etc. of the other figures.

A selection of, or input of, a recipient identifier is received at 802. For example, a user ID is selected. The selection of a recipient establishes a communication channel. In some examples, ECDH key exchange techniques are used to create the channel. For example, this selection causes each user device to generate a random ECC pair from their public and private keys, the public keys are exchanged via the messaging service, and a shared key is calculated by the devices based on the user's private key and the received public key. The shared key is the same key for both users. In some examples, the certificate for each device contains the public key for that device.

A message to send (text, image, audio, video, etc.) is received within the sending cryptographic messaging device at 804. The cryptographic messaging device signs the message with the private key using the cryptographic messaging device's HSM at 806.

The signed message then encrypted with the secret shared key at 812. Note that message may also include a "new" public key that the sender will use in the future. That is a ratcheting process may be followed such that the comprise of one key will not compromise all messages.

The encrypted, signed message is sent to the messaging service for delivery to the recipient at 814.

Figure 9:
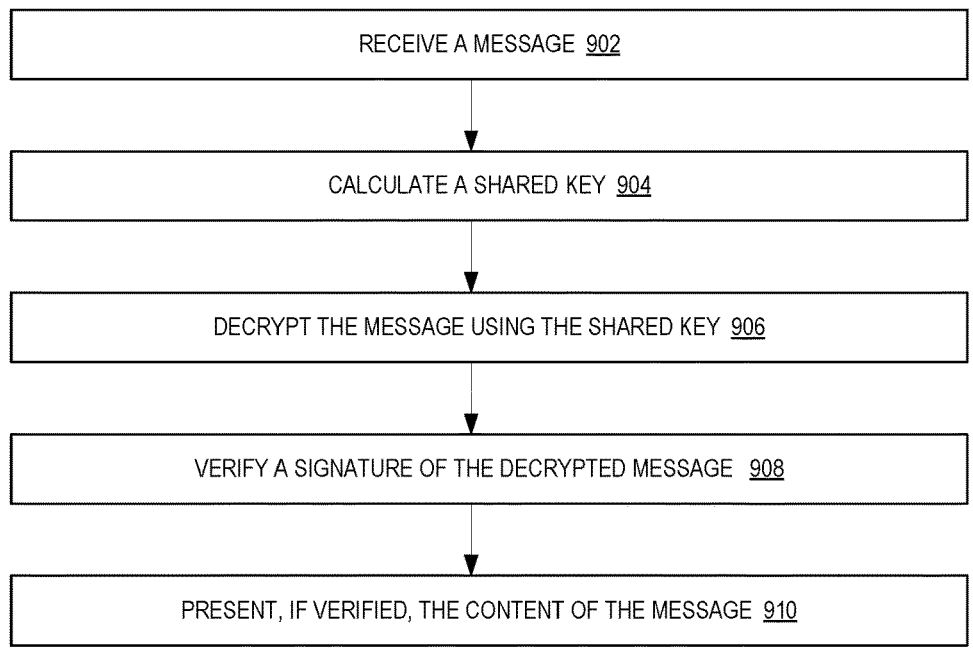
FIG. 9 is a flow diagram illustrating operations of a method for handling a message according to some examples.

The encrypted message from the cryptographic messaging device is routed to a receiving device at 606. In some examples, this occurs after at least the receiving cryptographic messaging device has been authenticated at 605. This may happen as the receiving device connects to the messaging service, at a scheduled time, etc. FIG. 9 is a flow diagram illustrating operations of a method for handling a message according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by one or more of a cryptographic messaging device, messaging service, etc. of the other figures.

A message is received by a cryptographic messaging device at 902. For example, a message is received from the messaging service detailed herein. In some examples, a Transport Layer Security (TLC) socket of the messaging service is listened to for a message.

A shared key is calculated at 904. In particular, a HSM of the cryptographic messaging device calculates a shared key from its stored private key and the sender's public key that is a part of the message or provided by the messaging service. Note that ratcheting may also be used.

The message is decrypted using the shared key at 906 and a signature of the decrypted message is verified at 908 to prove the identity of the sender. When the identity is verified and the message unaltered, the content of the message is presented to a user of the messaging service at 910. Note that in some examples once a message is received it is deleted from the messaging service.

Figure 10:
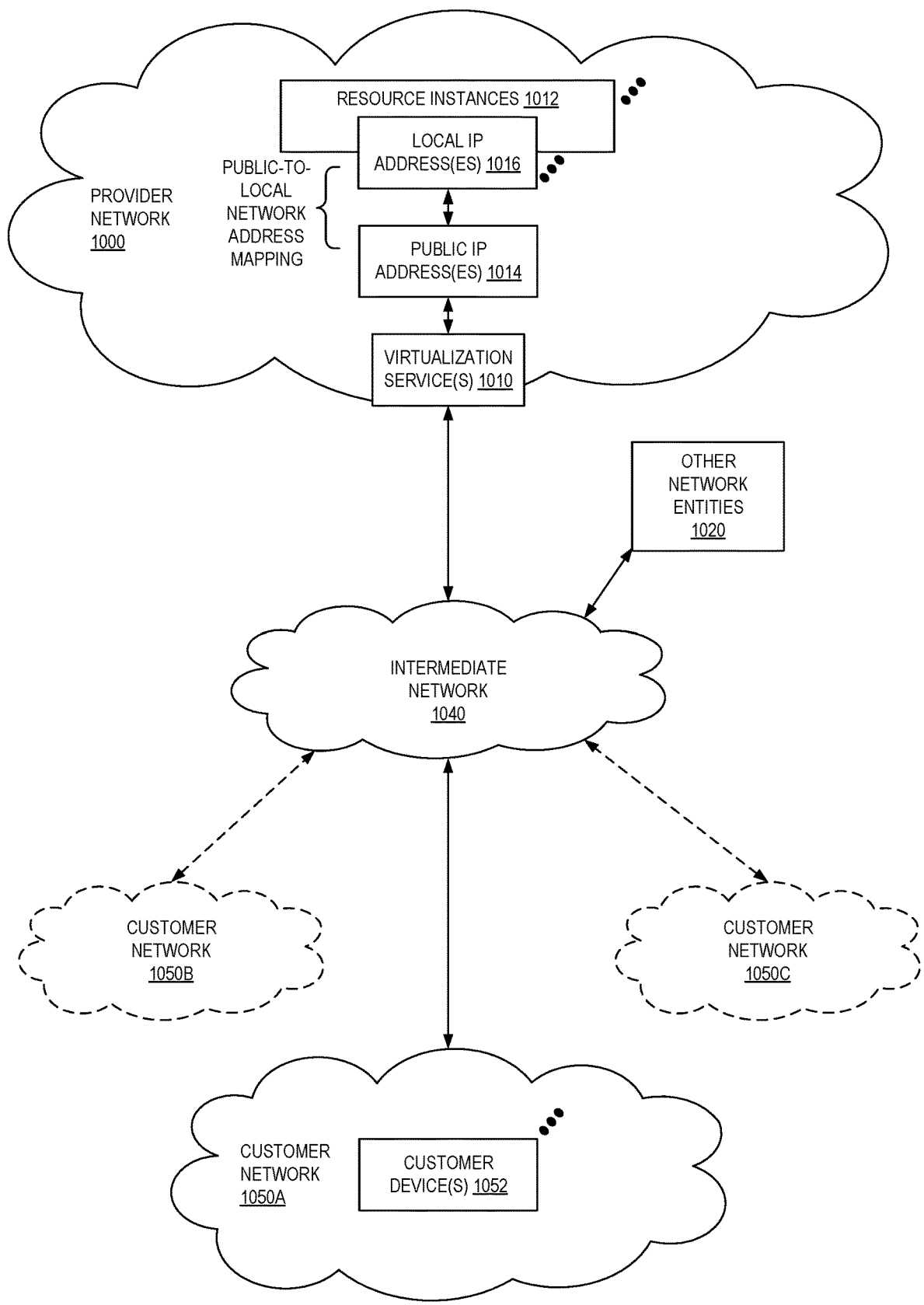
FIG. 10 illustrates an example provider network environment according to some examples.

FIG. 10 illustrates an example provider network (or "service provider system") environment according to some examples. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some examples, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
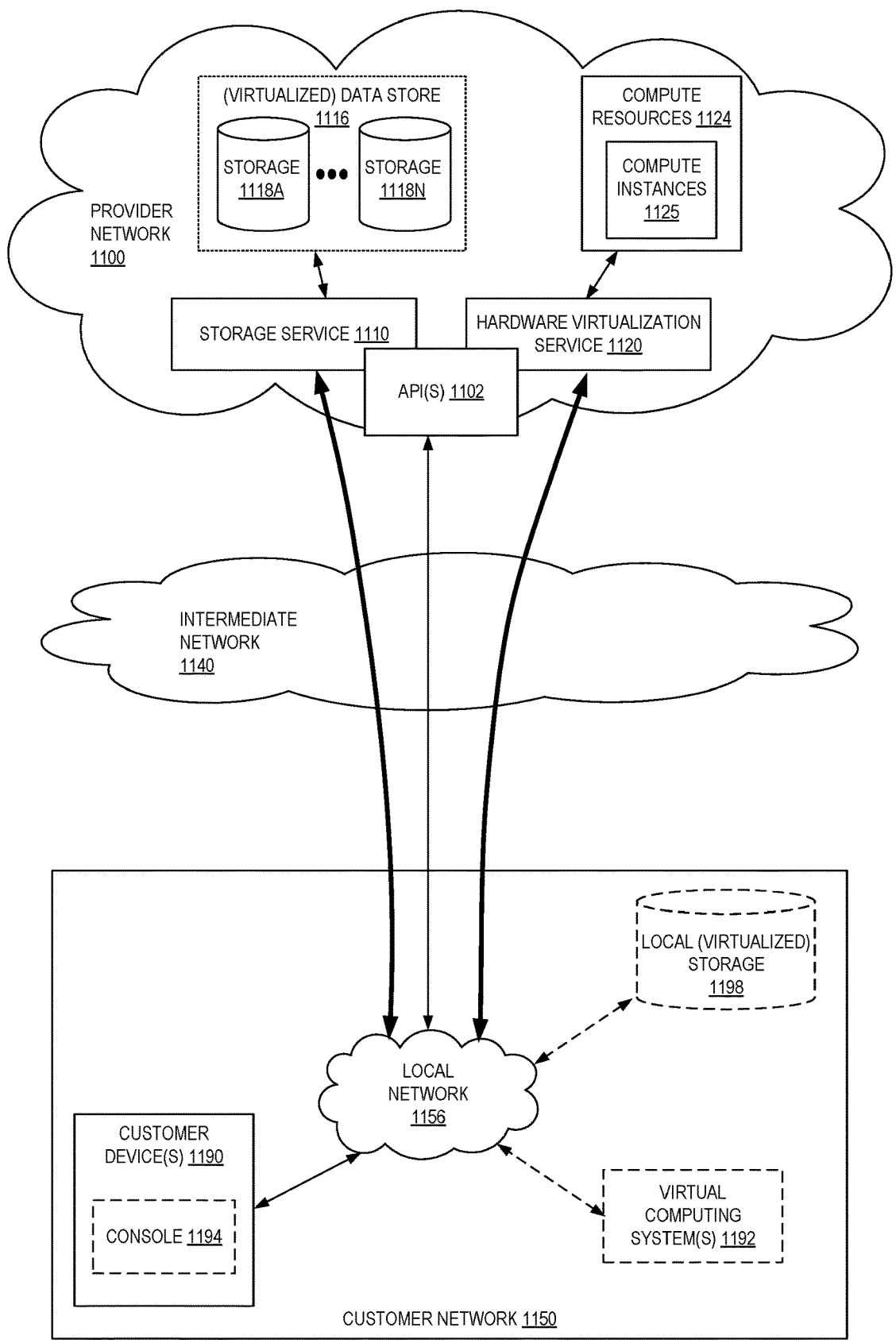
FIG. 11 is a block diagram of an example provider network that provides a storage service and a hardware virtualization service to customers according to some examples.

FIG. 11 is a block diagram of an example provider network environment that provides a storage service and a hardware virtualization service to customers, according to some examples. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some examples, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some examples, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some examples, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some examples, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
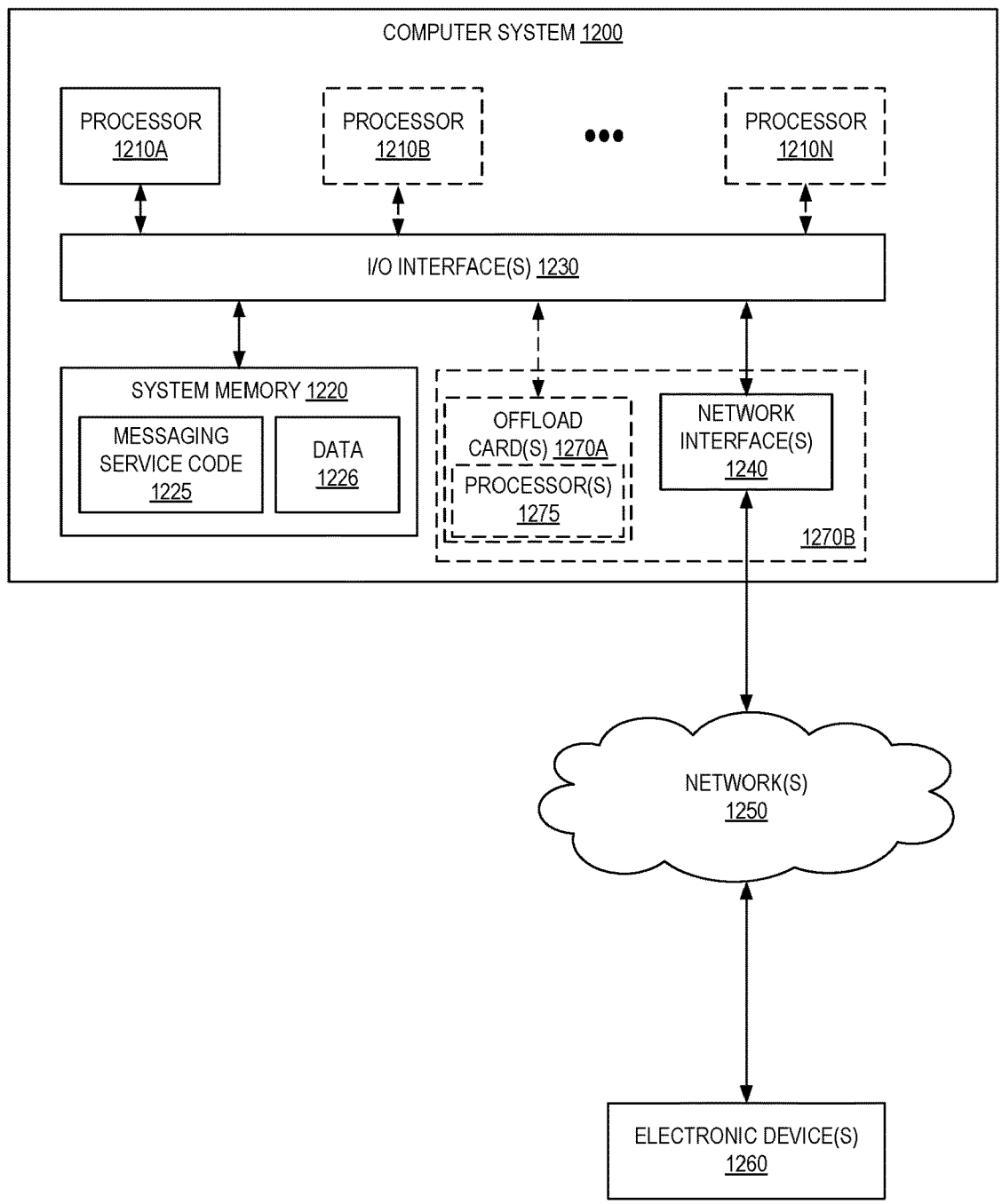
FIG. 12 is a block diagram illustrating an example computer system that can be used in some examples.

In some examples, a system that implements a portion or all of the techniques described herein can include a general-purpose computer system, such as the computer system 1200 (also referred to as a computing device or electronic device) illustrated in FIG. 12, that includes, or is configured to access, one or more computer-accessible media. In the illustrated example, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various examples the computer system 1200 can include one computing device or any number of computing devices configured to work together as a single computer system 1200.

In various examples, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various examples, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various examples, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1220 as messaging service code 1225 (e.g., executable to implement, in whole or in part, the device messaging service 501) and data 1226.

In some examples, the I/O interface 1230 can be configured to coordinate I/O traffic between the processor 1210, the system memory 1220, and any peripheral devices in the device, including the network interface 1240 and/or other peripheral interfaces (not shown). In some examples, the I/O interface 1230 can perform any necessary protocol, timing, or other data transformations to convert data signals from one component (e.g., the system memory 1220) into a format suitable for use by another component (e.g., the processor 1210). In some examples, the I/O interface 1230 can include support for devices attached through various types of peripheral buses, such as a variant of the Peripheral Component Interconnect (PCI) bus standard or the Universal Serial Bus (USB) standard, for example. In some examples, the function of the I/O interface 1230 can be split into two or more separate components, such as a north bridge and a south bridge, for example. Also, in some examples, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various examples, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some examples the offload card(s) 1270A or 1270B can perform compute instance management operations, such as pausing and/or un-pausing compute instances, launching and/or terminating compute instances, performing memory transfer/copying operations, etc. These management operations can, in some examples, be performed by the offload card(s) 1270A or 1270B in coordination with a hypervisor (e.g., upon a request from a hypervisor) that is executed by the other processors 1210A-1210N of the computer system 1200. However, in some examples the virtualization manager implemented by the offload card(s) 1270A or 1270B can accommodate requests from other entities (e.g., from compute instances themselves), and cannot coordinate with (or service) any separate hypervisor.

In some examples, the system memory 1220 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving an encrypted message originated by a first cryptographic messaging device at a second cryptographic messaging device, wherein the encrypted message was received by the second cryptographic messaging device via an attached network-enabled cellular device that itself received the encrypted message over a wireless interface, and wherein the second cryptographic messaging device is attachable and detachable to the network-enabled cellular device via an input/output interface, includes a second display, and does not include wireless networking capabilities;
calculating, by the second cryptographic messaging device, a shared key from a public key of the first cryptographic messaging device and a private key of the second cryptographic messaging device using a hardware security module of the second cryptographic messaging device;
decrypting, by the second cryptographic messaging device, the encrypted message using the shared key;
verifying, by the second cryptographic messaging device, a signature of the decrypted message; and
displaying, by the second cryptographic messaging device via the second display, contents of the decrypted message.

2. The computer-implemented method of claim 1, wherein the private key of the second cryptographic messaging device is stored in the hardware security module of the second cryptographic messaging device.

3. The computer-implemented method of claim 1, wherein the public key is managed by a messaging service of a provider network.

4. An apparatus comprising:
an input/output port configured to, via a physical attachment to another input/output port of a separate cellular device, receive an encrypted message obtained by the separate cellular device via a network;
a hardware security module (HSM) configured to decrypt the encrypted message, wherein the HSM is to include storage to store at least one private key to be used to decrypt the encrypted message; and
a screen to display contents of the decrypted message, wherein the apparatus does not include any cellular or wireless communications hardware,
wherein the HSM is further configured to encrypt a user-provided message provided via a virtual keyboard presented by the apparatus or a physical keyboard of the apparatus, and
wherein the input/output port is further configured to send the encrypted user-provided message to the separate cellular device, to cause the separate cellular device to send the encrypted user-provided message via the network to a destination.

5. The apparatus of claim 4, wherein power for the apparatus is to be provided from the separate cellular device via the input/output port.

6. The apparatus of claim 4, wherein the encrypted message was received by the separate cellular device from a message delivery service of a provider network, and wherein the encrypted message is to be deleted from the message delivery service upon the apparatus receiving the encrypted message.

7. The apparatus of claim 4, wherein the apparatus is to use an Elliptic Curve Diffie-Hellman key exchange with a sending device.

8. The apparatus of claim 4, wherein the encrypted message was originated by a sending device, the sending device comprising another cellular device that itself is attached to a cryptographic messaging device that created the encrypted message.

9. The apparatus of claim 4, wherein the encrypted message was originated by a message delivery service of a provider network, and wherein the message itself was originated by another cellular device that itself is attached to a cryptographic messaging device.

10. The apparatus of claim 4, wherein the HSM is to include at least one cryptographic engine and the storage is secure storage.

11. The apparatus of claim 4, further comprising:
a physical intrusion detection system to detect symptoms of physical tampering of the apparatus.

12. The apparatus of claim 4, further comprising:
a processor; and
memory coupled to the processor, the memory to store at least an operating system and a messaging application.

13. The apparatus of claim 4, wherein the encrypted message is to include one or more of text, a document, an image, a video file, or an audio file.

14. The apparatus of claim 4, further comprising:
the physical keyboard to input a message.

15. The apparatus of claim 4, wherein the encrypted message is to be deleted from the apparatus after a period of time has expired.

16. The apparatus of claim 4, further comprising:
a user authentication mechanism.

17. A system comprising:
a network-enabled cellular device, the cellular device including a processor, a memory, a display, a physical input/output port, and a wireless network interface; and
a cryptographic messaging device, the cryptographic messaging device being separate from the cellular device and capable of being physically and communicatively coupled to the cellular device, the cryptographic messaging device comprising:
an input/output port to be physically and communicatively coupled with the physical input/output port of the cellular device, the input/output port to receive an encrypted message from the cellular device that the cellular device itself received via its wireless network interface, wherein the cellular device is to provide network capabilities for the cryptographic messaging device,
a hardware security module (HSM) to decrypt the encrypted message, wherein the HSM is to include storage to store at least one private key to be used to decrypt the encrypted message, and
a screen to display contents of the decrypted message,
wherein the cryptographic messaging device does not include any cellular or wireless communications interface,
wherein the HSM is further to encrypt a user-provided message provided via a virtual keyboard presented by the cryptographic messaging device or a physical keyboard of the cryptographic messaging device, and
wherein the input/output port is further to cause the cellular device to send the encrypted user-provided message via the wireless network interface to a destination.

18. The system of claim 17, wherein the wireless network interface of the network-enabled device is a cellular device to couple to a telecommunications network.

19. The system of claim 17, further comprising:
a third one or more electronic devices to implement a messaging service of a provider network, the messaging service to transmit the encrypted message to the cellular device.

20. The system of claim 17, wherein the cryptographic messaging device is to use an Elliptic Curve Diffie-Hellman key exchange with a sending device.

* * * * *